(12) United States Patent
Zhang et al.

(10) Patent No.: US 12,438,761 B2
(45) Date of Patent: Oct. 7, 2025

(54) CONFIGURATION METHOD FOR TONE RESERVATION

(71) Applicant: ZTE CORPORATION, Guangdong (CN)

(72) Inventors: Chenchen Zhang, Shenzhen (CN); Nan Zhang, Shenzhen (CN); Wei Cao, Shenzhen (CN); Kaibo Tian, Shenzhen (CN); Zhen Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/359,948

(22) Filed: Jul. 27, 2023

(65) Prior Publication Data
US 2024/0031210 A1    Jan. 25, 2024

Related U.S. Application Data (63) Continuation of application No. PCT/CN2021/083377, filed on Mar. 26, 2021.

(51) Int. Cl.
*H04L 27/26* (2006.01)
(52) U.S. Cl.
CPC ................. *H04L 27/2618* (2013.01)
(58) Field of Classification Search
CPC ........... H04L 27/2618; H04L 5/0094
See application file for complete search history.

(56) References Cited

U.S. PATENT DOCUMENTS

2016/0192385 A1    6/2016  Tooher et al.
2021/0266210 A1*   8/2021  Namgoong ......... G06F 18/2148

FOREIGN PATENT DOCUMENTS

| CN | 101051859 A | 10/2007 |
| CN | 110768921 A | 2/2020 |
| EP | 1 944 903 A1 | 7/2008 |
| WO | WO-2018/098692 A1 | 6/2018 |
| WO | WO-2020/139181 A1 | 7/2020 |
| WO | WO-2020/246818 A1 | 12/2020 |
| WO | WO-2022/031703 A1 | 2/2022 |

OTHER PUBLICATIONS

Extended European Search Report for EP Appl. No. 21932279.9, dated May 23, 2024 (12 pages).
Qualcomm Incorporated, "Potential coverage enhancement techniques for PUSCH", 3GPP TSG-RAN WG1 Meeting #103e, R1-2009729, Nov. 13, 2020, e-Meeting (14 pages).
International Search Report and Written Opinion for PCT Appl. No. PCT/CN2021/083377, mailed on Dec. 30, 2021 (7 pages).
Qualcomm Incorporated, "BWP operation and other issues for NTN", 3GPP TSG RAN WG1 #103-e, R1-2009265, Nov. 13, 2020, e-Meeting (11 pages).

* cited by examiner

*Primary Examiner* — David S Huang
(74) *Attorney, Agent, or Firm* — Foley & Lardner LLP (57) ABSTRACT

A wireless communication method for use in a first wireless device is disclosed. The method comprises transmitting, to a second wireless device, configuration information associated with reserved resources within a plurality of resources.

16 Claims, 8 Drawing Sheets

Transmit, to a second wireless device, configuration information associated with reserved resources within a plurality of resources — 1400

CONFIGURATION METHOD FOR TONE RESERVATION

This application is a U.S. bypass continuation application of International Application Number PCT/CN2021/083377, filed Mar. 26, 2021, the content of which is incorporated herein by reference in its entirety.

TECHNICAL FIELD

This document is directed generally to wireless communications.

BACKGROUND

In orthogonal frequency-division multiplexing (OFDM) systems, each wireless carrier is divided into a huge number of orthogonal subcarriers. The payload data is parallelly carried in the subcarriers. Each subcarrier corresponds to a single tone wave in time domain and a superposition of the single tone waves forms the transmitted time domain signal. The single tone waves have independent phases and magnitudes. Therefore, when the number of waves is large, their superposition may have a high peak-to-average power ratio (PAPR).

SUMMARY

The high PAPR would cause a severe performance degradation in the wireless communication systems. For example, in an analog-digital convertor (ADC) and a digital-analog convertor (DAC), the high PAPR leads to a large signal-to-quantization noise. In addition, the non-linearity of the high-power-amplifier leads to distortion of the signal, which would cause inter-carrier interference and out-of-band radiation.

In the existing technology, tone reservation (TR) may be an effective method for reducing the high PAPR in the OFDM systems. In the TR, a part of the subcarriers is reserved for a PAPR reduction signal in the transmitter side. However, the generation of the PAPR reduction signal is heuristically and equips with a high computation complexity. Nowadays, a promising method of generating the PAPR reduction signal may be machine learning. Thus, how to support the machine learning based TR is an important topic to be considered.

This document relates to methods, systems, and devices for the tone reservation, and particular to methods, systems, and devices for configuring (allocating) reserved resources utilized for the tone reservation.

The present disclosure relates to a wireless communication method for use in a first wireless device. The method comprises transmitting, to a second wireless device, configuration information associated with reserved resources within a plurality of resources.

Various embodiments may preferably implement the following features:

Preferably or in some example embodiments, the reserved resources associated with the configuration information are configured to carry a peak-to-average power ratio, PAPR, reduction signal.

Preferably or in some example embodiments, a first reserved resource in the reserved resources overlaps a first channel or a reference signal, the first reserved resource is configured for the first channel and the first channel is one of physical uplink control channel, a physical random-access channel, synchronization signal block, physical broadcast channel, physical downlink control channel.

Preferably or in some example embodiments, a second reserved resource in the reserved resources overlaps a physical downlink shared channel, and the method further comprises:

transmitting, to the second wireless device, data of the physical downlink shared channel on the second reserved resource, wherein the data of the physical downlink shared channel on the second reserved resource is punctured, or ignoring resource elements in the second reserved resource during a resource element mapping procedure.

Preferably or in some example embodiments, the configuration information comprises at least one reservation pattern indicating the reserved resources within the plurality of resources.

Preferably or in some example embodiments, the configuration information comprises a set of reservation pattern indices of the at least one reservation pattern or a reservation pattern group index of a reservation pattern group comprising the at least one reservation pattern.

Preferably or in some example embodiments, the configuration information further comprises at least one condition associated with applying the at least one reservation pattern or a reservation pattern group comprising the at least one reservation pattern.

Preferably or in some example embodiments, the at least one condition is associated with at least one of a modulation and coding scheme, a waveform type, a bandwidth or a modulation type.

Preferably or in some example embodiments, the configuration information comprises an indication of the reserved resources within the plurality of resources, the indication comprises one of a bitmap, at least one resource indicator value, a set of bandwidth indices, a set of reservation pattern indices or a reservation pattern group index, and the bandwidth indices are associated with subcarriers, resource blocks or resource block groups.

Preferably or in some example embodiments, the at least one reservation pattern comprises a first reservation pattern comprising reserved resources which is consecutive in frequency domain.

Preferably or in some example embodiments, the at least one reservation pattern comprises a second reservation pattern comprising reserved resources which are consecutive in frequency domain and are located at one end of a frequency spectrum of the plurality of resources.

Preferably or in some example embodiments, the reservation pattern comprises at least one exception resource, wherein the at least one exception resource is configured for a data signal when the at least one exception resource is comprised in the reserved resources, and wherein the at least one exception resource is configured for a PAPR reduction signal when the at least one exception resource is not comprised in the reserved resources.

Preferably or in some example embodiments, the at least one reservation pattern comprises a third reservation pattern comprising a sub-pattern, and the sub-pattern comprises at least one reserved resource and repeats in a period of the third reservation pattern within the plurality of resources consecutive in frequency domain.

Preferably or in some example embodiments, the wireless communication method further comprises receiving, from the second wireless device, configuration information associated with recommended reserved resources.

Preferably or in some example embodiments, the wireless communication method further comprises receiving, from the second wireless device, a query of the configuration information associated with the reserved resources.

Preferably or in some example embodiments, the configuration information comprises at least one machine learning model configured to perform at least one of:
  generating a PAPR reduction signal, or
  determining the reserved resources within the plurality of resources.

Preferably or in some example embodiments, the configuration information comprises at least one of an architecture, a set of weight values, an optimizer or a set of losses and metrics of each machine learning model.

Preferably or in some example embodiments, the configuration information comprises at least one index of the at least one machine learning model.

Preferably or in some example embodiments, the wireless communication method further comprises receiving, from the second wireless device, configuration information associated with at least one recommended machine learning model.

Preferably or in some example embodiments, the wireless communication method further comprises transmitting, to the second wireless device, at least one condition associated with applying the at least one machine learning model.

Preferably or in some example embodiments, the at least one condition is associated with at least one of a modulation and coding scheme, a waveform type, a bandwidth or a modulation type.

Preferably or in some example embodiments, the first wireless device is one of a first wireless network node or a first wireless terminal and the second wireless device is one of a second wireless network node or a second wireless terminal.

The present disclosure relates to a wireless communication method for use in a second wireless device. The method comprises receiving, from a first wireless device, configuration information associated with reserved resources within a plurality of resources.

Various embodiments may preferably implement the following features:

Preferably or in some example embodiments, the reserved resources associated with the configuration information are configured to carry a peak-to-average power ratio, PAPR, reduction signal.

Preferably or in some example embodiments, a first reserved resource in the reserved resources overlaps a first channel or a reference signal, wherein the first reserved resource is configured for the first channel and the first channel is one of physical uplink control channel, a physical random-access channel, synchronization signal block, physical broadcast channel, physical downlink control channel.

Preferably or in some example embodiments, a second reserved resource in the reserved resources overlaps a physical downlink shared channel, and the wireless communication method further comprises:
  receiving, from the first wireless device, data of the physical downlink shared channel on the second reserved resource, wherein the data of the physical downlink shared channel on the second reserved resource is punctured, or
  ignoring resource elements in the second reserved resource during a resource element mapping procedure.

Preferably or in some example embodiments, the configuration information comprises at least one reservation pattern indicating the reserved resources within the plurality of resources.

Preferably or in some example embodiments, the configuration information comprises a set of reservation pattern indices of the at least one reservation pattern or a reservation pattern group index of a reservation pattern group comprising the at least one reservation pattern.

Preferably or in some example embodiments, the configuration information further comprises at least one condition associated with applying the at least one reservation pattern or a reservation pattern group comprising the at least one reservation pattern.

Preferably or in some example embodiments, the at least one condition is associated with at least one of a modulation and coding scheme, a waveform type, a bandwidth or a modulation type.

Preferably or in some example embodiments, the configuration information comprises an indication of the reserved resources within the plurality of resources, wherein the indication comprises one of a bitmap, at least one resource indicator value, a set of bandwidth indices, a set of reservation pattern indices or a reservation pattern group index and the bandwidth indices are associated with sub-carriers, resource blocks or resource block groups.

Preferably or in some example embodiments, the at least one reservation pattern comprises a first reservation pattern comprising reserved resources which is consecutive in frequency domain.

Preferably or in some example embodiments, the at least one reservation pattern comprises a second reservation pattern comprising reserved resources which are consecutive in frequency domain and are located at one end of a frequency spectrum of the plurality of resources.

Preferably or in some example embodiments, the reservation pattern comprises at least one exception resource, wherein the at least one exception resource is configured for a data signal when the at least one exception resource is comprised in the reserved resources, and wherein the at least one exception resource is configured for a PAPR reduction signal when the at least one exception resource is not comprised in the reserved resources.

Preferably or in some example embodiments, the at least one reservation pattern comprises a third reservation pattern comprising a sub-pattern, wherein the sub-pattern comprises at least one reserved resource and repeats in a period of the third reservation pattern within the plurality of resources consecutive in frequency domain.

Preferably or in some example embodiments, the wireless communication method further comprises transmitting, to the first wireless device, configuration information associated with recommended reserved resources.

Preferably or in some example embodiments, the wireless communication method further comprises transmitting, to the first wireless device, a query of the configuration information associated with the reserved resources.

Preferably or in some example embodiments, the configuration information comprises at least one machine learning model configured to perform at least one of:
  generating a PAPR reduction signal, or
  determining the reserved resources within the plurality of resources.

Preferably or in some example embodiments, the configuration information comprises at least one of an architecture, a set of weight values, an optimizer or a set of losses and metrics of each machine learning model.

Preferably or in some example embodiments, the configuration information comprises at least one index of the at least one machine learning model.

Preferably or in some example embodiments, the wireless communication method further comprises transmitting, to the first wireless device, configuration information associated with at least one recommended machine learning model.

Preferably or in some example embodiments, the wireless communication method further comprises receiving, from the first wireless device, at least one condition associated with applying the at least one machine learning model.

Preferably or in some example embodiments, the at least one condition is associated with at least one of a modulation and coding scheme, a waveform type, a bandwidth or a modulation type.

Preferably or in some example embodiments, the first wireless device is one of a first wireless network node or a first wireless terminal and the second wireless device is one of a second wireless network node or a second wireless terminal.

The present disclosure relates to a first wireless device. The first wireless device comprises a communication unit, configured to transmit, to a second wireless device, configuration information associated with reserved resources within a plurality of resources.

Various embodiments may preferably implement the following feature:

Preferably or in some example embodiments, the first wireless device further comprises a processor configured to perform any of aforementioned wireless communication methods.

The present disclosure relates to a second wireless device. The second wireless device comprises a communication unit, configured to receive, from a first wireless device, configuration information associated with reserved resources within a plurality of resources.

Various embodiments may preferably implement the following feature:

Preferably or in some example embodiments, the second wireless device further comprises a processor configured to perform any of aforementioned wireless communication methods.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
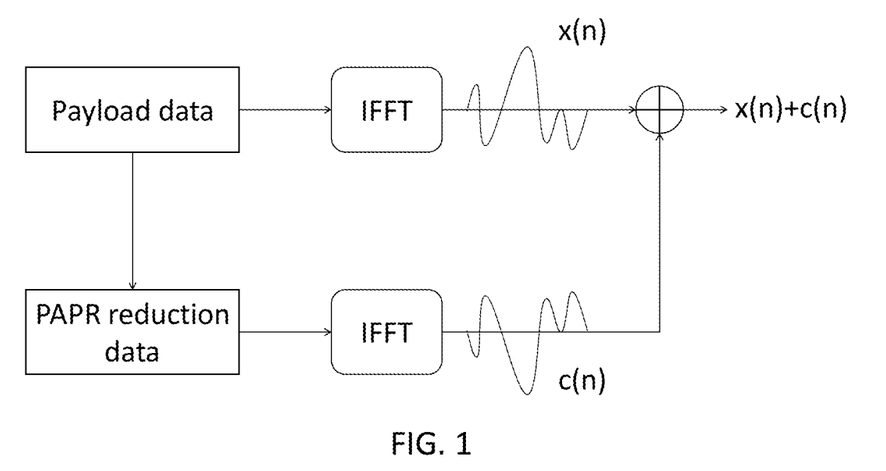
FIG. 1 shows a schematic diagram of tone reservation according to an embodiment of the present disclosure.

The tone reservation (TR) is an effective method to reduce the PAPR in the wireless communications and is briefly illustrated in the following. In the following, S denotes a set of subcarrier indices allocated to the transmitter (e.g., BS). S is divided into two disjoint sets $S_1$ and $S_2$. The payload data is carried in the set $S_1$. The PAPR reduction data is generated according to the payload data and is carried in the set $S_2$. As shown in FIG. 1, the payload data and the PAPR reduction data form the signals x(n) and (n), respectively. The signal C(n) counteracts the peaks in the signal x(n), so as to reduce the PAPR of the transmission. However, the generation of the signal C(n) equips with a high computation complexity and is far from optimal.

A promising method to generate the PAPR reduction signal C(n) may be using the neural network. The neural network with a back propagation is a powerful tool in optimization when the theoretical analysis is difficult. For a given specific condition (e.g., a given modulation type, given reserved subcarrier indices and/or given power density requirement), the neural network may be trained to generate the PAPR reduction signal C(n) based on the signal x(n). Furthermore, the positions of the reserved subcarriers, i.e., the set $S_2$, may also be optimized via utilizing certain techniques of the machine learning. In order to effectively perform the TR, the signaling used for supporting the machine learning based TR may need to be formulated.

In the fifth generation (5G) new radio (NR), the indication of a set of subcarrier indices is realized in resource allocation, where two kinds of allocation types (i.e., allocation type 0 and allocation type 1) are defined. In the allocation type 0, the resource blocks (RBs) are bundled into resource block groups (RBGs). In downlink control information (DCI), a string of bits (or bitmap) is used to allocate the RB s for data of a physical uplink shared channel (PUSCH) or a physical downlink shared channel (PDSCH), wherein each bit in the bit string (or bitmap) represents one RBG. In the allocation type 1, the allocated resource is assumed to be consecutive in the frequency domain. The allocated area is defined by the start of the allocated RBs and the number of allocated RBs. These two parameters are combined into a single value called resource indicator value (RIV). The representations of indices in the two allocation types can be also used in the TR for informing (e.g., indicating) the reserved subcarriers. In the resource allocation, this representation determines the resources in both the frequency domain and the time domain. However, in the TR, the allocation may only determine the reserved resources in the frequency domain and the resource unit in the bitmap/RIV may also be the RB.

To reduce the signaling overhead in allocating resources, the BS or the UE may pre-define and indicate some sets of reserved indices, which may also be called reservation patterns. The reserved wireless resources used in the transmission can be determined by one or more transmission patterns, which are also called pattern group. Thus, the reserved resources can be dynamically modified by simply indicating the index of a pattern group. One pattern can be denoted by an RIV, a bitmap, a set of indices, an integer representing the reserved subcarriers number and/or a periodicity, either alone or in a combination.

To support the machine learning based TR, the transmitter may need to inform the indices of reserved subcarriers to the receiver and/or the receiver may need to pre-configure the indices of reserved subcarriers. The receiver may also need to query the indices of the reserved subcarriers applied in the transmission.

In this disclosure, a method is proposed to provide a configuration for the TR. The characteristics of proposed method may at least include:

1. Reservation patterns are indicated from a transmitter to a receiver, wherein the transmitter may be a base station (BS), or a user equipment (UE) and the receiver may be the BS or the UE. Single reservation pattern may be described by a resource indicator value (RIV), a bitmap or a set of indices. In an embodiment, certain conditions (e.g., thresholds) on (e.g., related to, associated with) modulation and coding scheme(s) (MCS(s)) and/or bandwidth(s) and/or modulation type corresponding to different reservation pattern groups may be indicated from the transmitter to the receiver. Under such conditions, the reservation pattern group applied for the communications (i.e., transmissions/receptions) can be determined by (e.g., based on, according to) the indicated conditions.

2. Artificial intelligence (AI) models (e.g., machine learning models) used for the TR are indicated from the transmitter to the receiver. The indication may comprise at least one of the architecture, configuration, weights, optimizer, losses or metrics of the AI model. In an embodiment, certain conditions (e.g., thresholds) based on the MCS, the bandwidth and the modulation type corresponding to different AI models may be indicated from the transmitter to the receiver. The AI model applied in the communications can be determined based on the conditions.

3. The transmitter may indicate the reserved resources to the receiver. The reserved resources may be represented (e.g., indicated) by at least one of an RIV, a bitmap, a set of indices, pattern group indices and AI model indices.

4. The receiver may indicate the reserved resources to the transmitter, to recommend the reserved resources applied in the subsequent transmissions. The reserved resources may be represented (e.g., indicated) by at least one of an RIV, a bitmap, a set of indices, pattern group indices, and AI model indices.

5. The receiver sends a query to the transmitter for the reserved resources. The receiver may send back the (recommended) reserved resources as a reply. The reserved resources may be represented by at least one of an RIV, a bitmap, a set of indices, pattern group indices and AI model indices.

Embodiment 1: Signaling in Tone Reservation

In wireless transmissions, the transmitter may determine the reserved resources based on its own conditions and possible configurations from the receiver. The transmitter may inform the receiver about the indices of the reserved subcarriers when the reserved resources or the indices change or are queried by the receivers. The reserved resources may be pre-defined as reservation patterns to reduce the signaling overhead.

Case 1: Inform of Reservation Patterns

The reserved resources in transmission is pre-defined as a reservation pattern and indicated to the receiver. Each reservation pattern belongs to a reservation pattern group, and the reservation pattern group indices can be indicated to the receiver for dynamically adjusting the reserved resources applying in subsequent communications.

In an embodiment, the choosing of the reservation pattern group in transmission may also be determined based on the MCS and/or waveform type and/or bandwidth and/or modulation type. For example, the waveform type may be orthogonal frequency division multiple access (OFDMA) or direct Fourier transform spread orthogonal frequency division multiple access (DFT-S-OFDM). In this embodiment, the reservation pattern groups are designed for different sets of the MCS(s), waveform type(s), bandwidth(s), modulation type(s). The conditions (e.g., thresholds) to divide the sets are indicated to the receiver and the receiver can determine whether the TR is used and/or where are the reserved wireless resources based on the indicated conditions, the MCS, the bandwidth, and the modulation type applied in the communications. As a result, the signaling used for indicating the group indices to trigger the switches of applied reservation pattern (group) is saved.

Figure 2:
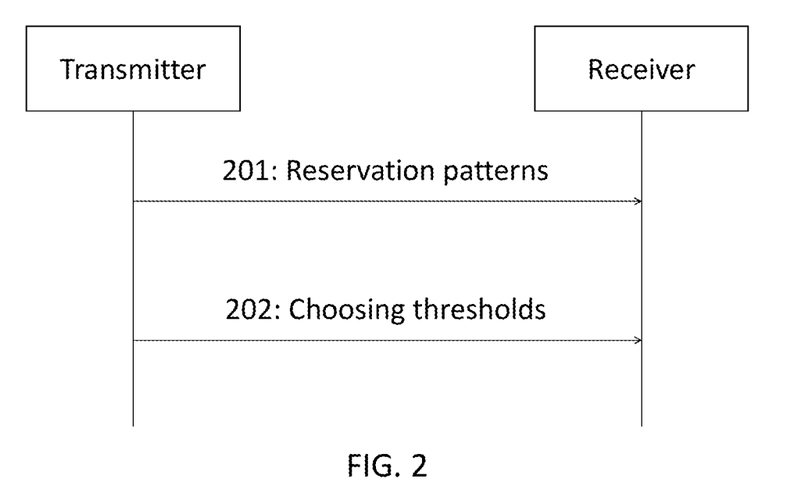
FIG. 2 shows a schematic diagram of a process according to an embodiment of the present disclosure.

FIG. 2 shows a schematic diagram of a process according to an embodiment of the present disclosure. In this embodiment, the transmitter transmits (e.g., notifies, indicates) the reservation patterns used for subsequent communications to the receiver (step 201). In this embodiment, the transmitter further transmits the choosing thresholds (i.e., conditions) corresponding to the reservation patterns to the receiver. For example, the choosing thresholds may relate to the MCS index applied in the communications. In an exemplified example of the choosing threshold related to the MCS index, the choosing thresholds comprises 2 thresholds TH1 and TH2, wherein TH1 is smaller than TH2. When the MCS index applied in the communication is equal to or smaller than TH1, the receiver determines that the TR is not used (i.e., no reserved resources). When the MCS index applied in the communication is greater than TH1 and is smaller than or equal to TH2, the receiver determines reserved patterns in a reservation pattern group RPG1 is used for determining the reserved resources for the TR (e.g., for carrying the PAPR reduction signal). When the MCS index applied in the communication is greater than TH2, the receiver determines that reserved pattern(s) in another reserved pattern group RPG2 is used for determining the reserved resources for the TR. Note that the choosing thresholds (i.e., conditions) may further relate to the bandwidth and/or modulation type of the communications.

In the present disclosure, the bandwidth may refer to:
1. The bandwidth for the overall system;
2. The bandwidth for the active bandwidth parts (BWPs), which is used for carrying the data; or
3. The bandwidth of the scheduled resources for transmitting the data.

In an embodiment, the bandwidth may be denoted as the number of physical RBs, the number of sub-carriers, etc.

Case 2: Inform of Reserved Resources

Figure 3:
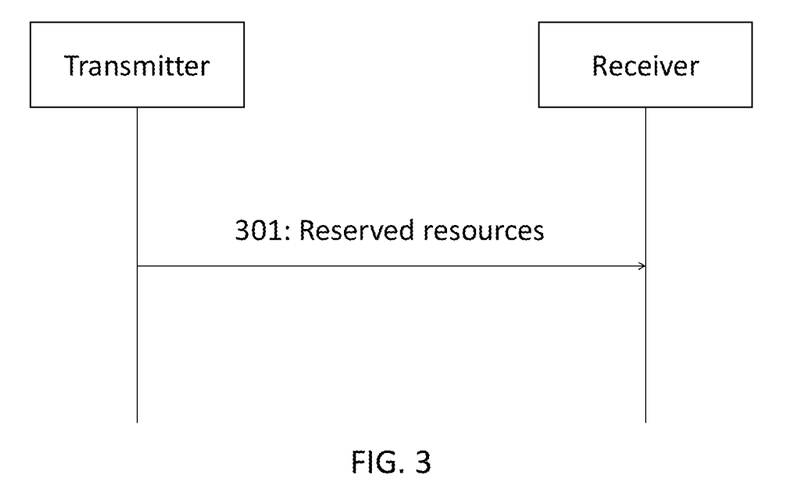
FIG. 3 shows a schematic diagram of a process according to an embodiment of the present disclosure.

When the receiver does not know the position of the reserved resources, or the position of the reserved resources is changed in the transmitter side, the transmitter notifies the reserved resources to relevant UEs as shown in step 301 of FIG. 3. The reserved resources may be notified in the form of a bitmap, an RIV, a set of indices or a reservation pattern group index.

Case 3: Configuration of Reserved Resources

Figure 4:
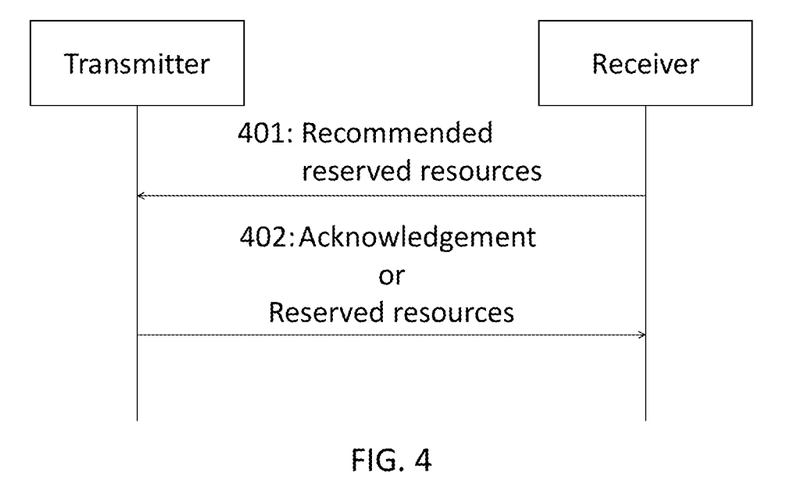
FIG. 4 shows a schematic diagram of a process according to an embodiment of the present disclosure.

When the receiver would like the reserved resources applied in the communication to be located in specific positions, the receiver may configure the position of the reserved resources by indicating the recommended reserved resources to the transmitter as shown in step 401 of FIG. 4. If the recommended reserved resources are acceptable to the transmitter, the transmitter sends an acknowledgement message to the receiver. If the recommended reserved resources are not acceptable, the transmitter transmits (e.g., indicates), to the receiver, the reserved resources different from the recommended reserved resources (step 402).

Case 4: Query of Reserved Resources

Figure 5:
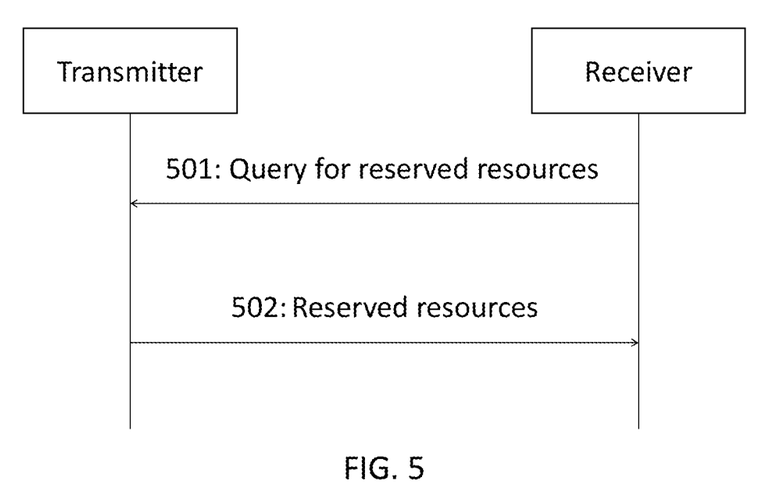
FIG. 5 shows a schematic diagram of a process according to an embodiment of the present disclosure.

When the receiver does not know or has doubts on the reserved resources applied in the communications, the receiver may send a query to the transmitter for the reserved resources (step 501 of FIG. 5). In response to the query, the transmitter indicates (e.g., transmits) the reserved resources to the receiver (step 502).

Case 5: Pattern for Continuous Reserved Subcarriers

Figure 6:
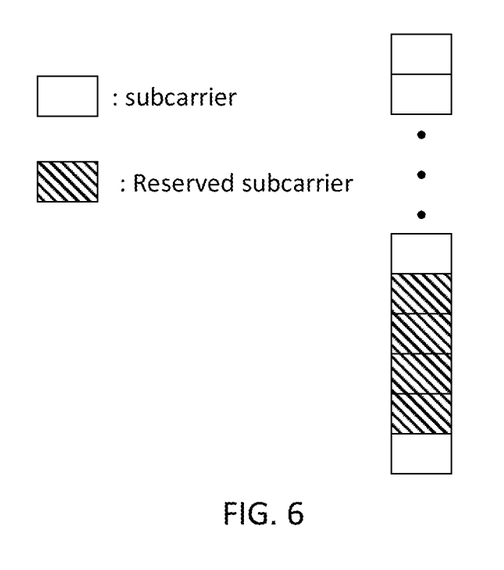
FIG. 6 shows a schematic diagram of a reservation pattern according to an embodiment of the present disclosure.

In an embodiment, the TR signals (e.g., PAPR reduction signal) carried on several contiguous (e.g., consecutive) subcarriers may have better performance in PAPR reduction than those carried on discrete subcarriers. When the reserved subcarriers are consecutive in the frequency domain as shown in FIG. 6, the position of the reserved resources in frequency domain may be defined by a start index and the number of the reserved subcarriers. In other words, the frequency domain reserved pattern may be denoted by a parameter pair (start index, the number of reserved subcarriers). These two parameters in the pair may also be combined into a specific RIV.

In an embodiment, the time domain reserved pattern may be denoted by a bitmap, in which each bit corresponds to an OFDM symbol.

Case 6: Pattern for Continuous Reserved Subcarriers in Bottom or Top

When the reserved subcarriers are pre-defined to be contiguous (or consecutive), e.g., in the frequency domain and in the bottom or the top of the transmission resources, the signaling to represent single frequency domain reserved pattern can be further reduced to an integer which denotes the number of the reserved subcarriers.

Figure 7:
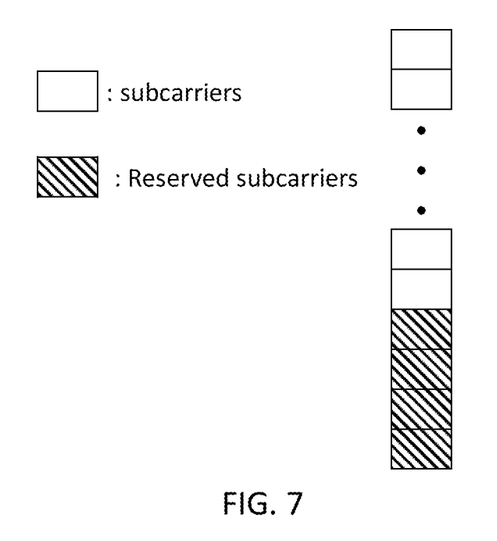
FIG. 7 shows a schematic diagram of a reservation pattern according to an embodiment of the present disclosure.

FIG. 7 shows a schematic diagram of a reserved pattern according to an embodiment of the present disclosure. In this embodiment, the reserved resources are pre-defined at the bottom of the transmission resources (e.g., subcarriers). Thus, the reserved pattern shown in FIG. 7 may be indicated by the value of 4 which is the number of reserved subcarriers included in the reserved pattern.

Case 7: Pattern for Continuous Reserved Subcarriers with a Few Exceptions

With respect to the contiguous reserved subcarriers in Case-5 and Case-6, certain extra optimization may bring exception subcarriers. For example, in FIG. 8, two subcarriers may be configured for opposite purposes. Under such conditions, the information of the frequency domain reserved pattern may further comprise the indices of the exception subcarriers. For example, the exception subcarrier (s) may be denoted by the subcarrier indices, the parameter pair (start index, number), the RIV, or the integer(s).

Figure 8:
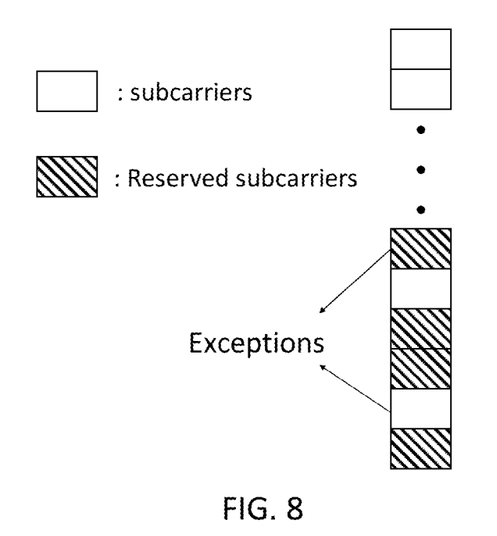
FIG. 8 shows a schematic diagram of a reservation pattern according to an embodiment of the present disclosure.

In an embodiment, the reserved pattern is denoted by an RIV indicating that the reserved pattern comprises the subcarriers with the indices 3 to 10. In addition, the subcarriers with the indices 9 and 12 are configured as the exception subcarriers (e.g., by or based on corresponding part (e.g., parameter pair, RIV or integer(s)) in the configuration information). Under such conditions, the subcarrier with the index 9 is not the reserved resource and the subcarrier with the index 12 becomes the reserved resource. That is, the reserved resources comprised in the reserved pattern comprise the subcarriers with the indices 3 to 8, 10 and 12 in this embodiment.

Case 8: Pattern for Reserved Subcarriers with Periodicity

Figure 9:
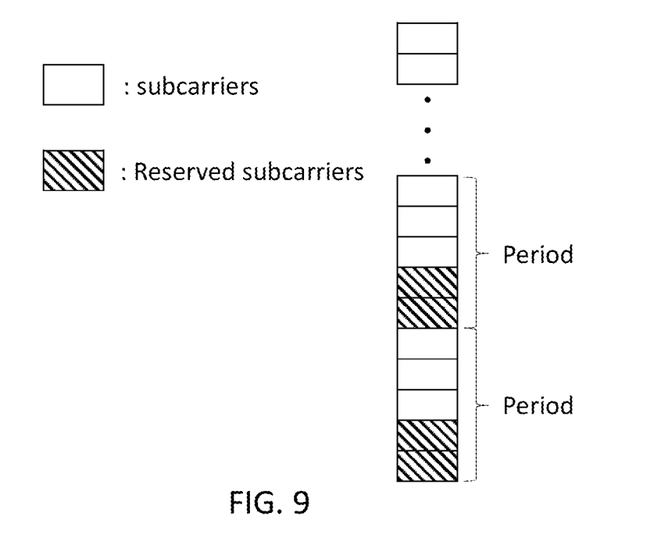
FIG. 9 shows a schematic diagram of a reservation pattern according to an embodiment of the present disclosure.

The TR method in a narrow band may be applied to a wide band with a period. This periodicity can be used for the TR in a flexible bandwidth. As shown in FIG. 9, the period may be described by an integer (e.g., 5) in the information of the frequency domain pattern which comprises 2 reserved subcarriers in the bottom of the communication resources. With the configuration of the period, the frequency domain pattern is periodically repeated within the communication resource based on the configured period.

Embodiment 2: AI Based Methods in Tone Reservation

The AI (e.g., machine learning) may be an efficient method to improve the performance of the TR. The AI models may be used to generate data (e.g., PAPR reduction signal) carried on the reserved resources, or optimize the positions of the reserved resources.

Case 1: Inform of AI Models

Figure 10:
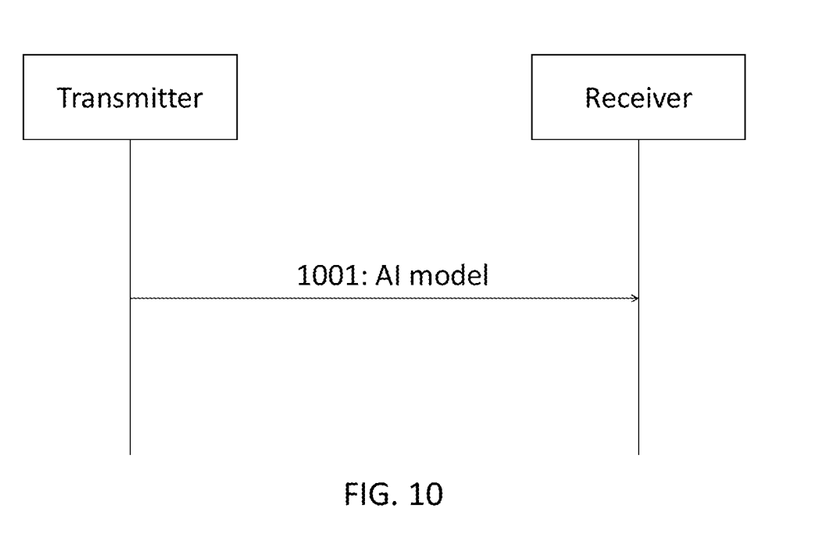
FIG. 10 shows a schematic diagram of a process according to an embodiment of the present disclosure.

In FIG. 10, the AI model used in the TR may be transmitted from one wireless node (e.g., transmitter) to another wireless node (e.g., receiver), in which each wireless node can be a UE or a BS. The AI model may be transmitted in the form of:
1. The architecture, or configuration, which specifies what layers the model contain, and how they are connected.
2. A set of weight values, which also called the state of the model
3. Optimizer in the model
4. A set of losses and metrics
5. Combination of one or more of the above options.

In an embodiment of the AI model adopting a neural network, the architecture refers to a structure of the neural network. For example, the information related to the structure of the neural network may comprise the number of layers comprised in the neural network, the type of each layer (e.g., dense layer, convolution layer, activation layer, and so on), the size of each layer, and connections between the layers for forming the neural network.

In addition, each layer comprises many parameters which are trained to achieve specific targets. The values of the parameters are also called weights (or weight values). Based on the weight values the trained model may be revered.

In an embodiment, the optimizer of the model defines how the model adjusts each weight with the gradients in the training.

In an embodiment, the losses and metrics are used in the training process to produce the gradient based on the input and output of the neural network.

Based on the architecture, the weights, the optimizer and the losses and metrics, the receiver is able to recover the trained model and perform further training.

Note that, the transmitter may not transmit all of the architecture, the weights, the optimizer and the losses and metrics to the receiver for indicating the AI model. For example, a part of the architecture, the weights, the optimizer and the losses and metrics may be pre-defined or pre-configured. Under such conditions, the transmitter does not need to transmit the pre-defined or pre-configured information.

Case 2: Inform of Applied AI Models

Figure 11:
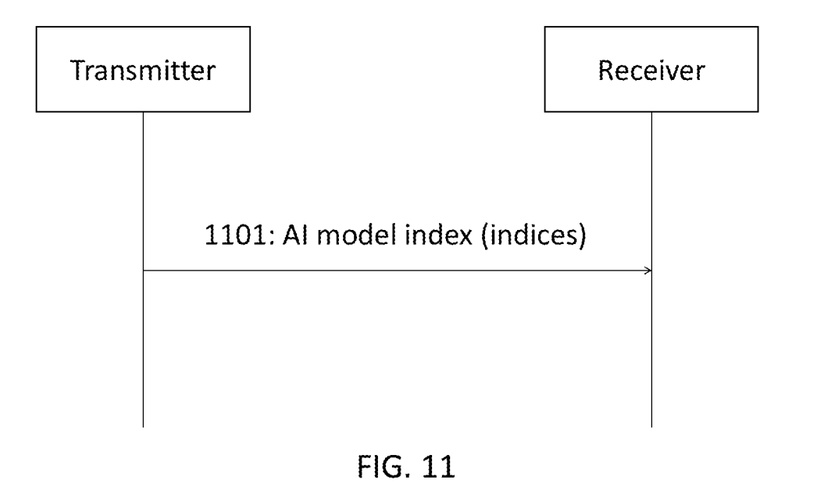
FIG. 11 shows a schematic diagram of a process according to an embodiment of the present disclosure.

In an embodiment, the AI models may be predefined and have a corresponding AI model index. The transmitter may indicate one or more indices of the AI models to the receiver as shown in FIG. 11. The corresponding AI models will be applied in the following transmission.

Case 3: Configuration of Applied AI Models

Figure 12:
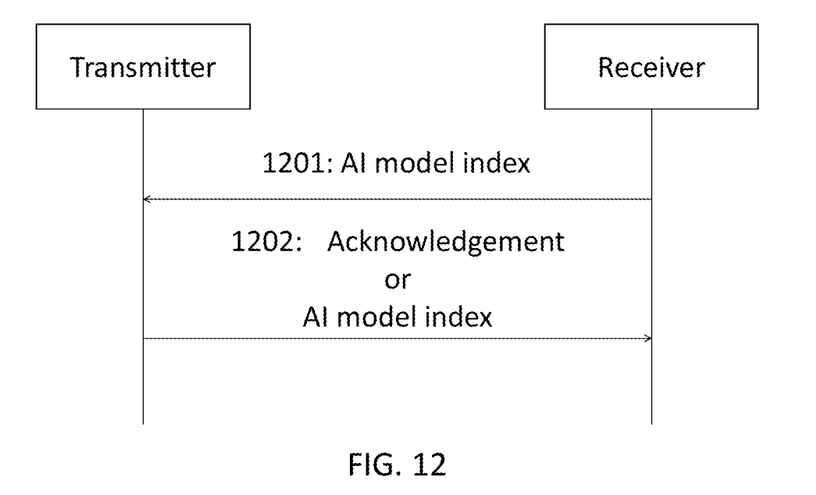
FIG. 12 shows a schematic diagram of a process according to an embodiment of the present disclosure.
Figure 13:
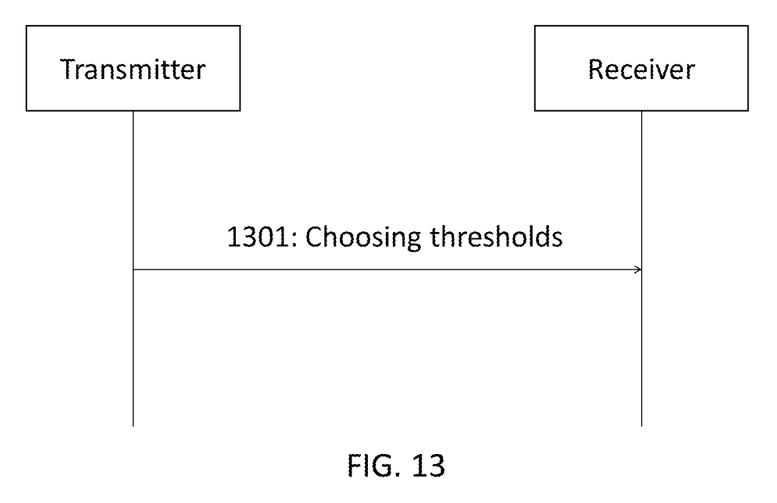
FIG. 13 shows a schematic diagram of a process according to an embodiment of the present disclosure.

In an embodiment shown in FIG. 12, the receiver may indicate one or more indices of recommended AI models to the transmitter (step 1201). In an embodiment, the corresponding AI models are applied in the following transmission and an acknowledgement message are sent back to the receiver. In an embodiment, if deciding to use another AI model, the transmitter indicates the index of the applied model, rather than the acknowledgement message, to the receiver.

Case 4: Configuration of Triggering Condition of AI Models

The AI models can be designed for different sets of MCS(s), waveform type(s), bandwidth(s), modulation type(s). In an embodiment, the waveform type may be OFDMA or DFT-S-OFDM. The thresholds (e.g., conditions) to divide the sets are indicated to the receiver, so the receiver can judge whether the AI model is used and which AI model is applied based on the thresholds, the MCS, the waveform type, the bandwidth, and the modulation type. Then the indication of the model indices to trigger the switch of AI model is saved.

Figure 14:
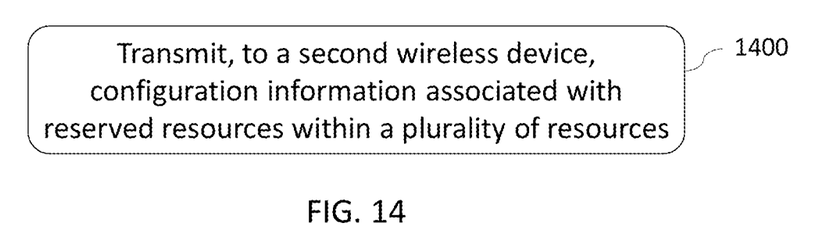
FIG. 14 shows a flowchart of a wireless communication method according to an embodiment of the present disclosure.

FIG. 14 shows a flowchart of a method according to an embodiment of the present disclosure. The method shown in FIG. 14 may be used in a first wireless device (e.g., a transmitter, a BS or a UE) and comprises the following step:

Step 1400: Transmit, to a second wireless device, configuration information associated with reserved resources within a plurality of resources.

In FIG. 14, the first wireless device transmits configuration information associated with reserved resources within a plurality of resources to a second wireless device (e.g., a receiver, another BS or another UE). For example, the reserved resources may be utilized for achieving the TR in the subsequent communications.

In an embodiment, the reserved resources associated with the configuration information are configured to carry a PAPR reduction signal. The remaining resources are configured to carry corresponding data signal (see. FIG. 1). In an embodiment, the data signal may comprise at least one of physical uplink control channel (PUCCH), physical random-access channel (PRACH), synchronization signal block (SSB), physical broadcast channel (PBCH), physical downlink control channel (PDCCH), physical downlink shared channel (PDSCH), physical uplink shared channel (PUSCH).

In an embodiment, when the reserved resources overlap certain channel(s), such as PUCCH, PRACH, SSB, PBCH, or PDCCH, the reserved resources overlapping the certain channel(s) may be ignored by the second wireless device. For example, a first reserved resource in the reserved resource overlaps with one of PUCCH, PRACH, SSB, PBCH and PDCCH and the first reserved resource may remain being configured for (carrying) the overlapped channel.

In an embodiment, the reserved resources may overlap a PDSCH. Under such a condition, the reserved resources overlapping the PDSCH may be configured to transmit data of the PDSCH and the data on the reserved resources overlapping the PDSCH is punctured. As an alternative, the resource elements (REs) in the reserved resources overlapping the PDSCH may not be counted during a RE mapping procedure.

In an embodiment, the configuration information comprises at least one reservation pattern indicating the reserved resources within the plurality of resources. That is, one or more reserved patterns are predefined and the reserved resources are indicated by indicating one of the predefined reserved pattern.

In an embodiment, the configuration information comprises a set of reservation pattern indices of the at least one reservation pattern or a reservation pattern group index of a reservation pattern group comprising the at least one reservation pattern.

In an embodiment, the configuration information further comprises at least one condition (e.g., thresholds) associated with applying the at least one reservation pattern or a reservation pattern group comprising the at least one reservation pattern.

In an embodiment, the at least one condition is associated with at least one of an MCS, a waveform type, a bandwidth or a modulation type, e.g., applied in the subsequent communications.

In an embodiment, the configuration information comprises an indication of the reserved resources within the plurality of resources. For example, the indication may comprise one of a bitmap, at least one RIV, a set of bandwidth indices, a set of bandwidth indices (e.g., subcarrier/RB/RBG indices), a set of reservation pattern indices or a reservation pattern group index.

In an embodiment, the at least one reservation pattern comprises a first reservation pattern comprising reserved resources which is consecutive (e.g., continuous or contiguous) in frequency domain.

In an embodiment, the at least one reservation pattern comprises a second reservation pattern comprising reserved resources which are contiguous in frequency domain and are located at one end of a frequency spectrum of the plurality of resources (see, e.g., FIG. 7).

In an embodiment, the reservation pattern comprises at least one exception resource. The at least one exception resource is configured for a data signal when the at least one exception resource is comprised in the reserved resources and is configured for a PAPR reduction signal when the at least one exception resource is not comprised in the reserved resources (see, e.g., FIG. 8).

In an embodiment, the at least one reservation pattern comprises a third reservation pattern comprising a sub-pattern. The sub-pattern comprises at least one reserved resource and repeats in a period of the third reservation pattern within the plurality of resources, e.g., contiguous in frequency domain (see FIG. 9).

In an embodiment, the first wireless device may receive configuration information associated with recommended reserved resources from the second wireless device. Note that, the configuration information associated with recommended reserved resources may be received before step 1400 (i.e., before transmitting the configuration information of the reserved resources). If the recommended reserved resources are acceptable, the first wireless device may transmit an acknowledge message to the second wireless device. If the recommended reserved resources are not acceptable, the first wireless device may transmit the configuration information associated with the reserved resources different from the recommended reserved resources to the second wireless device.

In an embodiment, the first wireless device may receive a query of the configuration information of the reserved resources from the second wireless device.

In an embodiment, the configuration information comprises at least one machine learning model (e.g., AI model) configured to perform at least one of:
generating a PAPR reduction signal, or
determining the reserved resources within the plurality of resources.

In an embodiment, each of the at least one machine learning model may be associated with a set of reserved resource patterns. In this embodiment, by training the machine learning model, the reserved resources are determined based on one reserved resource pattern in the set of reserved resource patterns.

In an embodiment, the configuration information comprises at least one of an architecture, a set of weight values, an optimizer or a set of losses and metrics of each machine learning model.

In an embodiment, the configuration information comprises at least one index of the at least one machine learning model. That is, the machine learning model may be predefined in the first wireless device and/or the second wireless device.

In an embodiment, the first wireless device may transmit at least one condition (e.g., threshold) associated with applying the at least one machine learning model to the second wireless device.

In an embodiment, the at least one condition is associated with at least one of an MCS, a waveform type, a bandwidth or a modulation type, e.g., of subsequent communications.

In an embodiment, the subsequent communications have one or more layers (e.g., PDSCH or PUSCH communications). In this embodiment, the reserved resources (e.g., reserved pattern) may be applied to the one or more layers of the communications. That is, the same reserved resources (e.g., reserved pattern) are used cross layer. As an alternative, the reserved resources (e.g., reserved pattern) are only applied for the layer with the lowest demodulation reference signal (DM-RS) port index. As another alternative, the reserved resources (e.g., reserved pattern) are only applied for the layer with the highest DM-RS port index.

Figure 15:
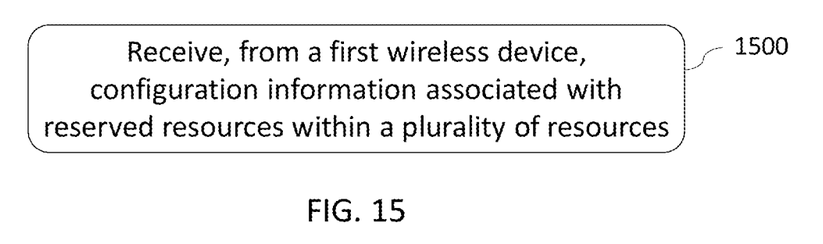
FIG. 15 shows a flowchart of a wireless communication method according to an embodiment of the present disclosure.

FIG. 15 shows a flowchart of a method according to an embodiment of the present disclosure. The method shown in FIG. 15 may be used in a second wireless device (e.g., a receiver, a BS or a UE) and comprises the following step:

Step 1500: Receive, from a first wireless device, configuration information associated with reserved resources within a plurality of resources.

In FIG. 15, the second wireless device receives configuration information associated with reserved resources within a plurality of resources from a first wireless device (e.g., a transmitter, another BS or another UE). For example, the reserved resources may be utilized for achieving the TR in the subsequent communications.

In an embodiment, the reserved resources associated with the configuration information are configured to carry a PAPR reduction signal. The remaining resources are configured to carry corresponding data signal (see. FIG. 1). In an embodiment, the data signal may comprise at least one of PUCCH, PRACH, SSB, PBCH, PDCCH, PDSCH.

In an embodiment, when the reserved resources overlap certain channel(s), such as PUCCH, PRACH, SSB, PBCH, or PDCCH, the reserved resources overlapping the certain channel(s) may be ignored by the second wireless device. For example, a first reserved resource in the reserved resource overlaps with one of PUCCH, PRACH, SSB, PBCH and PDCCH and the first reserved resource may remain being configured for (carrying) the overlapped channel.

In an embodiment, the reserved resources may overlap a PDSCH. Under such a condition, the reserved resources overlapping the PDSCH may be configured to transmit data of the PDSCH and the data on the reserved resources overlapping the PDSCH is punctured. As an alternative, the resource elements (REs) in the reserved resources overlapping the PDSCH may not be counted during a RE mapping procedure.

In an embodiment, the configuration information comprises at least one reservation pattern indicating the reserved resources within the plurality of resources. That is, one or more reserved patterns are predefined and the reserved resources are indicated by indicating one of the predefined reserved pattern.

In an embodiment, the configuration information comprises a set of reservation pattern indices of the at least one reservation pattern or a reservation pattern group index of a reservation pattern group comprising the at least one reservation pattern.

In an embodiment, the configuration information further comprises at least one condition (e.g., thresholds) associated with applying the at least one reservation pattern or a reservation pattern group comprising the at least one reservation pattern.

In an embodiment, the at least one condition is associated with at least one of an MCS, a waveform type, a bandwidth or a modulation type, e.g., applied in the subsequent communications.

In an embodiment, the configuration information comprises an indication of the reserved resources within the plurality of resources. For example, the indication may comprise one of bitmap, at least one RIV, a set of bandwidth indices, a set of bandwidth indices (e.g., subcarrier/RB/RBG indices), a set of reservation pattern indices or a reservation pattern group index.

In an embodiment, the at least one reservation pattern comprises a first reservation pattern comprising reserved resources which is consecutive (e.g., continuous or contiguous) in frequency domain.

In an embodiment, the at least one reservation pattern comprises a second reservation pattern comprising reserved resources which are contiguous in frequency domain and are located at one end of a frequency spectrum of the plurality of resources (see, e.g., FIG. 7).

In an embodiment, the reservation pattern comprises at least one exception resource. The at least one exception resource is configured for a data signal when the at least one exception resource is comprised in the reserved resources and is configured for a PAPR reduction signal when the at least one exception resource is not comprised in the reserved resources (see, e.g., FIG. 8).

In an embodiment, the at least one reservation pattern comprises a third reservation pattern comprising a sub-pattern. The sub-pattern comprises at least one reserved resource and repeats in a period of the third reservation pattern within the plurality of resources, e.g., contiguous in frequency domain (see FIG. 9).

In an embodiment, the second wireless device may transmit configuration information associated with recommended reserved resources from the second wireless device. Note that, the configuration information associated with recommended reserved resources may be transmit before step 1500 (i.e., before receiving the configuration information of the reserved resources). If the recommended reserved resources are acceptable, the first wireless device may transmit an acknowledge message to the second wireless device. If the recommended reserved resources are not acceptable, the second wireless device may receive the configuration information associated with the reserved resources different from the recommended reserved resources from the first wireless device.

In an embodiment, the second wireless device may transmit a query of the configuration information of the reserved resources to the first wireless device.

In an embodiment, the configuration information comprises at least one machine learning model (e.g., AI model) configured to perform at least one of:
  generating a PAPR reduction signal, or
  determining the reserved resources within the plurality of resources.

In an embodiment, each of the at least one machine learning model may be associated with a set of reserved resource patterns. In this embodiment, by training the machine learning model, the reserved resources are determined based on one reserved resource pattern in the set of reserved resource patterns.

In an embodiment, the configuration information comprises at least one of an architecture, a set of weight values, an optimizer or a set of losses and metrics of each machine learning model. For example, the machine learning model may adopt (be built based on) neural network.

In an embodiment, the configuration information comprises at least one index of the at least one machine learning model. That is, the machine learning model may be predefined in the first wireless device and/or the second wireless device.

In an embodiment, the first wireless device may transmit at least one condition (e.g., threshold) associated with applying the at least one machine learning model to the second wireless device.

In an embodiment, the at least one condition is associated with at least one of an MCS, a waveform type, a bandwidth or a modulation type, e.g., of subsequent communications.

In an embodiment, the subsequent communications have one or more layers (e.g., PDSCH or PUSCH communications). In this embodiment, the reserved resources (e.g., reserved pattern) may be applied to the one or more layers of the communications. That is, the same reserved resources (e.g., reserved pattern) are used cross layer. As an alternative, the reserved resources (e.g., reserved pattern) are only applied for the layer with the lowest DM-RS port index. As another alternative, the reserved resources (e.g., reserved pattern) are only applied for the layer with the highest DM-RS port index.

Figure 16:
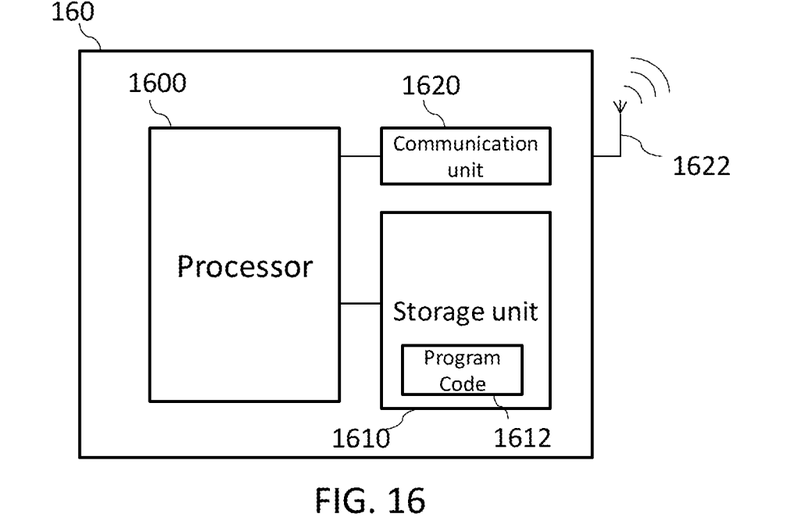
FIG. 16 shows an example of a schematic diagram of a wireless terminal according to an embodiment of the present disclosure.

FIG. 16 relates to a schematic diagram of a wireless terminal 160 according to an embodiment of the present disclosure. The wireless terminal 160 may be a wireless device, a user equipment (UE), a mobile phone, a laptop, a tablet computer, an electronic book or a portable computer system and is not limited herein. The wireless terminal 160 may include a processor 1600 such as a microprocessor or Application Specific Integrated Circuit (ASIC), a storage unit 1610 and a communication unit 1620. The storage unit 1610 may be any data storage device that stores a program code 1612, which is accessed and executed by the processor 1600. Embodiments of the storage unit 1612 include but are not limited to a subscriber identity module (SIM), read-only memory (ROM), flash memory, random-access memory (RAM), hard-disk, and optical data storage device. The communication unit 1620 may a transceiver and is used to transmit and receive signals (e.g., messages or packets) according to processing results of the processor 1600. In an embodiment, the communication unit 1620 transmits and receives the signals via at least one antenna 1622 shown in FIG. 16.

In an embodiment, the storage unit 1610 and the program code 1612 may be omitted and the processor 1600 may include a storage unit with stored program code.

The processor 1600 may implement any one of the steps in exemplified embodiments on the wireless terminal 160, e.g., by executing the program code 1612.

The communication unit 1620 may be a transceiver. The communication unit 1620 may as an alternative or in addition be combining a transmitting unit and a receiving unit configured to transmit and to receive, respectively, signals to and from a wireless network node (e.g., a base station).

Figure 17:
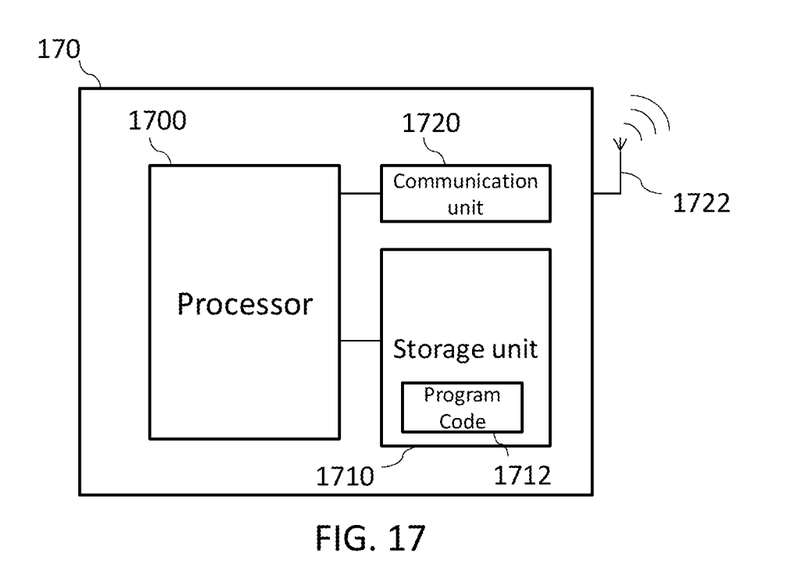
FIG. 17 shows an example of a schematic diagram of a wireless network node according to an embodiment of the present disclosure.

FIG. 17 relates to a schematic diagram of a wireless network node 170 according to an embodiment of the present disclosure. The wireless network node 170 may be a wireless device, a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 170 may comprise (perform) at least one network function such as an access and mobility management function (AMF), a session management function (SMF), a user place function (UPF), a policy control function (PCF), an application function (AF), etc. The wireless network node 170 may include a processor 1700 such as a microprocessor or ASIC, a storage unit 1710 and a communication unit 1720. The storage unit 1710 may be any data storage device that stores a program code 1712, which is accessed and executed by the processor 1700. Examples of the storage unit 1712 include but are not limited to a SIM, ROM, flash memory, RAM, hard-disk, and optical data storage device. The communication unit 1720 may be a transceiver and is used to transmit and receive signals (e.g., messages or packets) according to processing results of the processor 1700. In an example, the communication unit 1720 transmits and receives the signals via at least one antenna 1722 shown in FIG. 17.

In an embodiment, the storage unit 1710 and the program code 1712 may be omitted. The processor 1700 may include a storage unit with stored program code.

The processor 1700 may implement any steps described in exemplified embodiments on the wireless network node 170, e.g., via executing the program code 1712.

The communication unit 1720 may be a transceiver. The communication unit 1720 may as an alternative or in addition be combining a transmitting unit and a receiving unit configured to transmit and to receive, respectively, signals to and from a wireless terminal (e.g., a user equipment or another wireless network node).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations but, can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein but, is to be accorded the widest scope consistent with the novel features and principles disclosed herein, as recited in the claims below.

The invention claimed is:

1. A wireless communication method for use in a first wireless device, the wireless communication method comprising:
    transmitting, to a second wireless device, configuration information associated with reserved resources within a plurality of resources,
    wherein the configuration information comprises at least one machine learning model configured to perform at least one of:
        generating a peak-to-average power ratio (PAPR) reduction signal, or
        determining the reserved resources within the plurality of resources,
    wherein the configuration information comprises an indication of the reserved resources within the plurality of resources, wherein the indication comprises one of bitmap, at least one resource indicator value (RIV), a set of bandwidth indices, a set of reservation pattern indices or a reservation pattern group index, and
    wherein the configuration information comprises at least one of an architecture, an optimizer or a set of losses and metrics of each machine learning model.

2. The wireless communication method of claim 1, wherein the reserved resources associated with the configuration information are configured to carry the PAPR reduction signal.

3. The wireless communication method of claim 1, further comprising:
    receiving, from the second wireless device, configuration information associated with at least one recommended machine learning model.

4. The wireless communication method of claim 1, further comprising:
    transmitting, to the second wireless device, at least one condition associated with applying the at least one machine learning model, wherein the at least one condition is associated with at least one of a modulation and coding scheme, a waveform type, a bandwidth or a modulation type.

5. A wireless communication method for use in a second wireless device, the wireless communication method comprising:
    receiving, from a first wireless device, configuration information associated with reserved resources within a plurality of resources,
    wherein the configuration information comprises at least one machine learning model configured to perform at least one of:
        generating a peak-to-average power ratio (PAPR) reduction signal, or
        determining the reserved resources within the plurality of resources,
    wherein the configuration information comprises an indication of the reserved resources within the plurality of resources, wherein the indication comprises one of bitmap, at least one resource indicator value (RIV), a set of bandwidth indices, a set of reservation pattern indices or a reservation pattern group index, and
    wherein the configuration information comprises at least one of an architecture, an optimizer or a set of losses and metrics of each machine learning model.

6. The wireless communication method of claim 5, wherein the reserved resources associated with the configuration information are configured to carry the PAPR reduction signal.

7. The wireless communication method of claim 5, further comprising:
    transmitting, to the first wireless device, configuration information associated with at least one recommended machine learning model.

8. The wireless communication method of claim 5, further comprising:
    receiving, from the first wireless device, at least one condition associated with applying the at least one machine learning model, wherein the at least one condition is associated with at least one of a modulation and coding scheme, a waveform type, a bandwidth or a modulation type.

9. A first wireless device, comprising:
    at least one processor, configured to transmit, via a transmitter to a second wireless device, configuration information associated with reserved resources within a plurality of resources,
    wherein the configuration information comprises at least one machine learning model configured to perform at least one of:
        generating a peak-to-average power ratio (PAPR) reduction signal, or
        determining the reserved resources within the plurality of resources,
    wherein the configuration information comprises an indication of the reserved resources within the plurality of resources, wherein the indication comprises one of bitmap, at least one resource indicator value (RIV), a set of bandwidth indices, a set of reservation pattern indices or a reservation pattern group index, and
    wherein the configuration information comprises at least one of an architecture, an optimizer or a set of losses and metrics of each machine learning model.

10. The first wireless device of claim 9, wherein the reserved resources associated with the configuration information are configured to carry the PAPR reduction signal.

11. The first wireless device of claim 9, wherein the at least one processor is further configured to:
 receive, via a receiver from the second wireless device, configuration information associated with at least one recommended machine learning model.

12. The first wireless device of claim 9, wherein the at least one processor is further configured to:
 transmit, via the transmitter to the second wireless device, at least one condition associated with applying the at least one machine learning model, wherein the at least one condition is associated with at least one of a modulation and coding scheme, a waveform type, a bandwidth or a modulation type.

13. A second wireless device, comprising:
 at least one processor, configured to receive via a receiver, from a first wireless device, configuration information associated with reserved resources within a plurality of resources,
 wherein the configuration information comprises at least one machine learning model configured to perform at least one of:
  generating a peak-to-average power ratio (PAPR) reduction signal, or
  determining the reserved resources within the plurality of resources,
 wherein the configuration information comprises an indication of the reserved resources within the plurality of resources, wherein the indication comprises one of bitmap, at least one resource indicator value (RIV), a set of bandwidth indices, a set of reservation pattern indices or a reservation pattern group index, and
 wherein the configuration information comprises at least one of an architecture, an optimizer or a set of losses and metrics of each machine learning model.

14. The second wireless device of claim 13, wherein the reserved resources associated with the configuration information are configured to carry the PAPR reduction signal.

15. The second wireless device of claim 13, wherein the at least one processor is further configured to:
 transmit, via a transmitter to the first wireless device, configuration information associated with at least one recommended machine learning model.

16. The second wireless device of claim 13, wherein the at least one processor is further configured to:
 receive, via the receiver from the first wireless device, at least one condition associated with applying the at least one machine learning model, wherein the at least one condition is associated with at least one of a modulation and coding scheme, a waveform type, a bandwidth or a modulation type.

* * * * *